(12) United States Patent
Yamanaka

(10) Patent No.: US 8,964,428 B2
(45) Date of Patent: Feb. 24, 2015

(54) POWER CONVERSION DEVICE

(71) Applicant: Kabushiki Kaisha Yaskawa Denki, Kitakyushu-shi (JP)

(72) Inventor: Katsutoshi Yamanaka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 180 days.

(21) Appl. No.: 13/719,229

(22) Filed: Dec. 19, 2012

(65) Prior Publication Data

US 2013/0336023 A1 Dec. 19, 2013

(30) Foreign Application Priority Data

Jun. 15, 2012 (JP) ................................. 2012-136218

(51) Int. Cl.
*H02M 1/34* (2007.01)
*H02M 3/158* (2006.01)

(52) U.S. Cl.
USPC .............................. 363/50; 323/207; 323/271

(58) Field of Classification Search
USPC ............................. 363/50; 323/205, 207, 271
See application file for complete search history.

(56) References Cited

U.S. PATENT DOCUMENTS

| 6,226,192 B1 * | 5/2001 | Yamanaka et al. ......... 363/56.01 |
| 6,784,644 B2 * | 8/2004 | Xu et al. ....................... 323/225 |
| 6,984,964 B2 * | 1/2006 | Chang ........................... 323/207 |
| 8,830,707 B2 * | 9/2014 | Yamanaka ...................... 363/50 |

FOREIGN PATENT DOCUMENTS

| JP | 09-69768 | 3/1997 |
| JP | 2000-69754 | 3/2000 |
| JP | 2005-65356 | 3/2005 |
| JP | 2007-330023 | 12/2007 |
| JP | 2010-148333 | 7/2010 |
| JP | 2011-030312 | 2/2011 |
| JP | 2012-186924 | 9/2012 |
| JP | 2013-183587 | 9/2013 |
| WO | WO 2006/035752 | 4/2006 |
| WO | WO 2006/112275 | 10/2006 |

OTHER PUBLICATIONS

Japanese Decision of a Patent Grant for corresponding JP Application No. 2012-136218, Apr. 1, 2014.
Extended European Search Report for corresponding EP Application No. 12198088.2—1809, Nov. 26, 2014.

* cited by examiner

*Primary Examiner* — Jessica Han
(74) *Attorney, Agent, or Firm* — Mori & Ward, LLP

(57) ABSTRACT

A power conversion device according to embodiments includes a plurality of switch groups, a plurality of inductors, and a snubber circuit. The switch groups are respectively provided for input phases and each of the switch groups has a plurality of one-way switches that connects the corresponding input phase and output phases. The plurality of inductors are respectively connected between the input phases and the switch groups, and are coupled to one another so that current flowing through the one-way switch of one switch group moves to and continues to flow through the turned-on one-way switch of the other switch group when the one-way switch of the one switch group is turned off. The snubber circuit clamps a voltage based on the maximum voltage occurring on the plurality of inductors to a predetermined value.

17 Claims, 9 Drawing Sheets

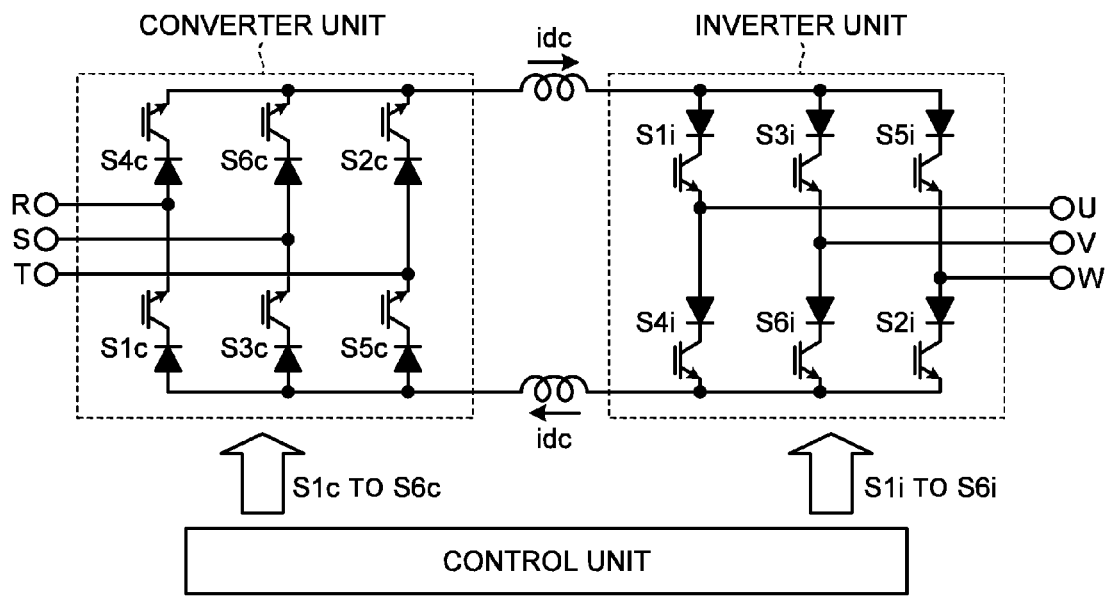
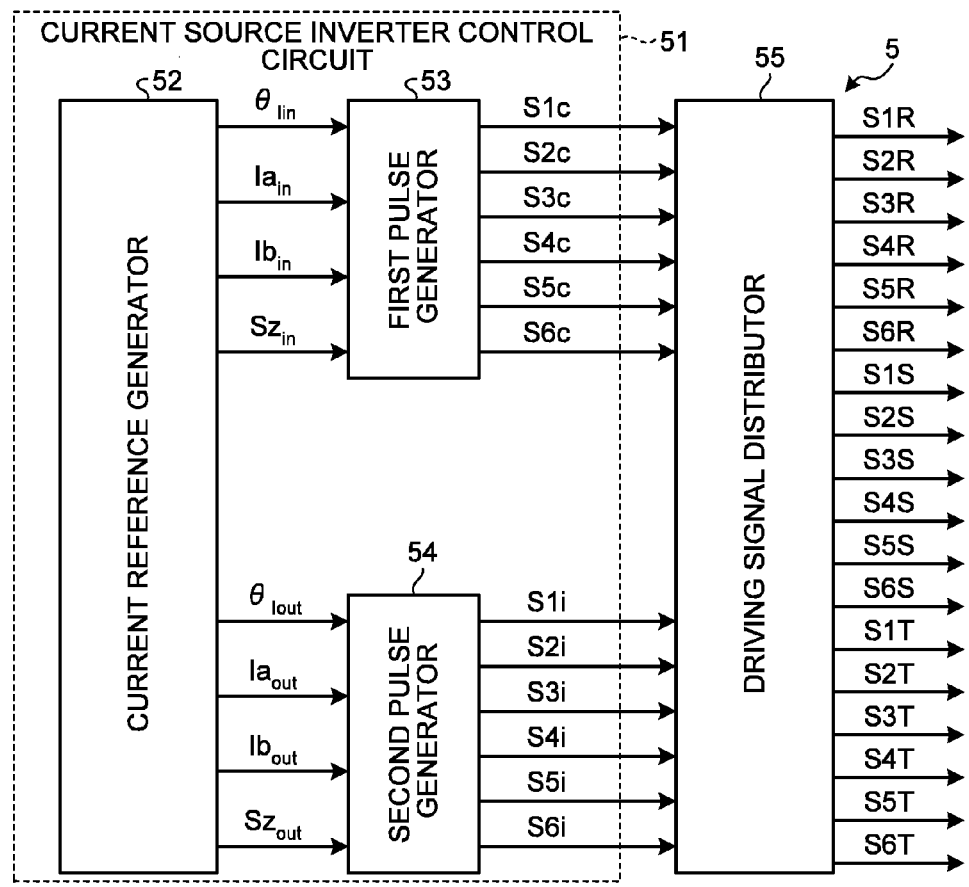

POWER CONVERSION DEVICE

CROSS-REFERENCE TO RELATED APPLICATION

This application is based upon and claims the benefit of priority of the prior Japanese Patent Application No. 2012-136218, filed on Jun. 15, 2012, the entire contents of which are incorporated herein by reference.

FIELD

The embodiments discussed herein are directed to a power conversion device.

BACKGROUND

As a power conversion device, there is known a matrix converter that includes a plurality of bidirectional switches that connects each input phase to each output phase. A technology for realizing the step-up function of the matrix converter has been known as disclosed in, for example, WO2006/112275.

The matrix converter having a step-up function includes electric reactors between each phase and the bidirectional switches. The matrix converter short-circuits the input-phase-side electric reactor and then releases the reactor from the short circuit by using the bidirectional switches to output a voltage higher than a supply voltage.

However, because the conventional matrix converter having a step-up function includes electric reactors, capacitors, and connection/disconnection means at both sides of input and output, there is a problem that the device should be large-sized.

SUMMARY

A power conversion device according to embodiments includes a plurality of switch groups, a plurality of inductors, and a snubber circuit. The switch groups are respectively provided for input phases and each of the switch groups has a plurality of one-way switches that connects the corresponding input phase and output phases. The plurality of inductors are respectively connected between the input phases and the switch groups, and are coupled to one another so that current flowing through the one-way switch of one switch group moves to and continues to flow through the turned-on one-way switch of the other switch group when the one-way switch of the one switch group is turned off. The snubber circuit clamps a voltage based on the maximum voltage occurring on the plurality of inductors to a predetermined value.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 2 is a diagram illustrating the configuration of a three-phase-input/three-phase-output current source inverter;

FIG. 3 is a diagram illustrating a configuration example of a control unit according to the first embodiment;

DESCRIPTION OF EMBODIMENTS

Hereinafter, a power conversion device according to embodiments of the present disclosure will be explained in detail with reference to the accompanying drawings. In addition, the embodiments disclosed below are not intended to limit the present invention.

First Embodiment

Figure 1:
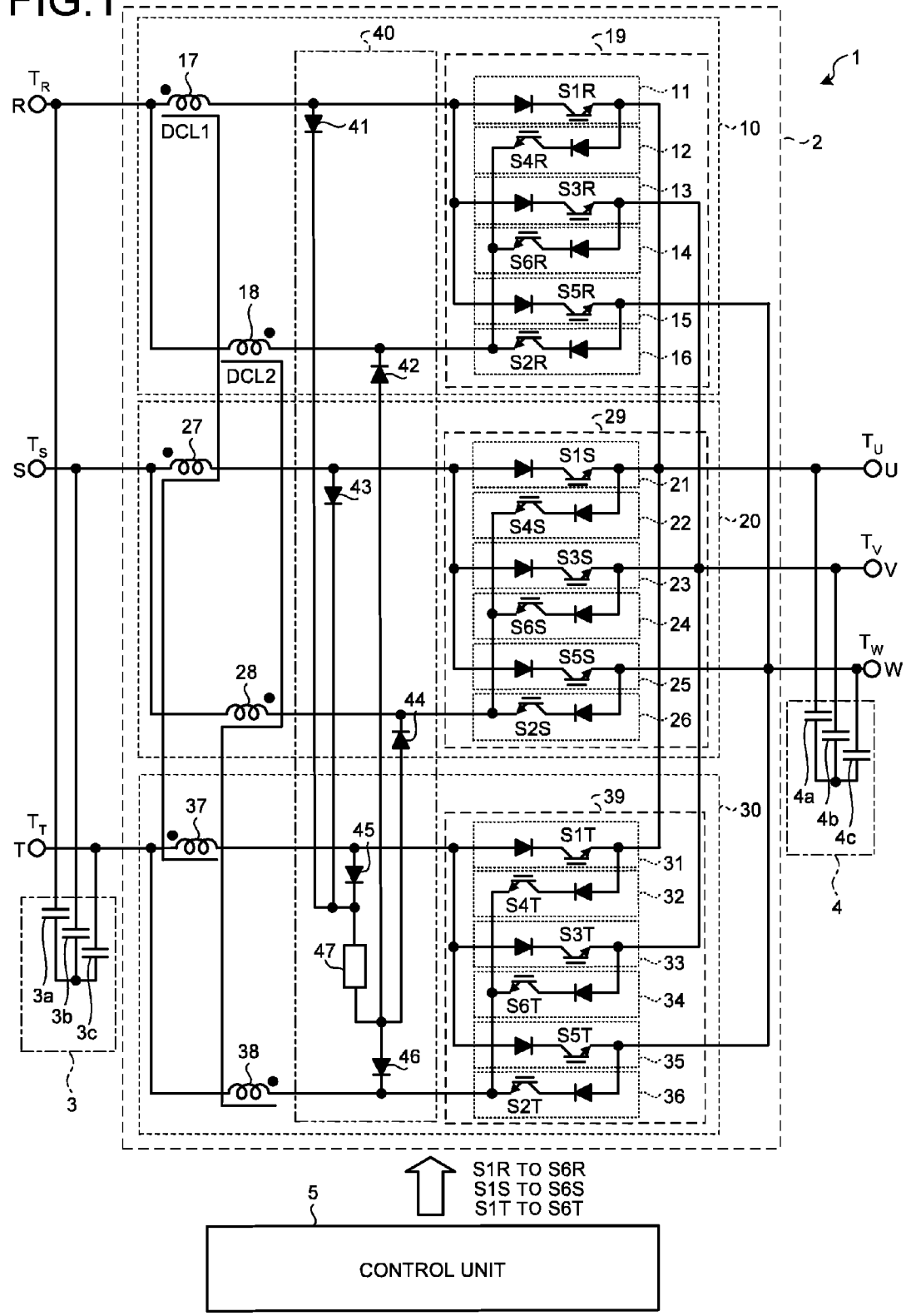
FIG. 1 is a diagram illustrating a configuration example of a power conversion device according to a first embodiment.

First, a power conversion device according to the first embodiment will be explained. FIG. 1 is a diagram illustrating a configuration example of a power conversion device 1 according to the first embodiment.

As illustrated in FIG. 1, the power conversion device 1 according to the first embodiment is a current source power conversion device. The power conversion device 1 includes a power conversion unit 2, a first filter unit 3, a second filter unit 4, and a control unit 5. The power conversion device 1 can perform bidirectional power conversion and further perform voltage step-up and step-down operations between three input phases of R, S, and T phases and three output phases of U, V, and W phases.

The power conversion unit 2 includes an R-phase input terminal $T_R$, an S-phase input terminal $T_S$, and a T-phase input terminal $T_T$, which are respectively connected to R, S, and T input phases, and a U-phase output terminal $T_U$, a V-phase output terminal $T_V$, and a W-phase output terminal $T_W$, which are respectively connected to U, V, and W output phases. The R-phase input terminal $T_R$, the S-phase input terminal $T_S$, and the T-phase input terminal $T_T$ are connected to, for example, the respective phases of a three-phase AC power supply. The U-phase output terminal $T_U$, the V-phase output terminal $T_V$, and the W-phase output terminal $T_W$ are connected to, for example, the respective phases of a load such as an electric motor.

The power conversion unit 2 further includes a first switching unit 10, a second switching unit 20, and a third switching unit 30 that are provided between the input terminals $T_R$, $T_S$, and $T_T$, and the output terminals $T_U$, $T_V$, and $T_W$. Each of the switching units 10, 20, and 30 constitutes a current source inverter circuit.

Each of the switching units 10, 20, and 30 includes two DC inductors and a switch group that has six one-way switches. Each of the one-way switches consists of a diode and a switching element. The switching element includes, for example, IGBT (Insulated Gate Bipolar Transistor) or MOSFET (Metal-Oxide-Semiconductor Field-Effect Transistor). Herein, a reverse blocking IGBT may be used in place of a diode and a switching element.

The DC inductors are magnetically coupled between the three switching units 10, 20, and 30. More specifically, DC inductors 17, 27, and 37 are magnetically coupled to each other to actually constitute one inductor element DCL1. Moreover, DC inductors 18, 28, and 38 are magnetically coupled to each other to actually constitute one inductor element DCL2.

In an example illustrated in FIG. 1, the coupling direction of the DC inductors 17, 18, 27, 28, 37, and 38 are illustrated with black dots. Moreover, the number of turns of each winding of the coupled DC inductors 17, 27, and 37 is the same and the number of turns of each winding of the coupled DC inductors 18, 28, and 38 is the same. Therefore, a current flowing through one winding can be moved to another winding without changing the magnitude between the windings of the coupled DC inductors.

More specifically, currents flowing through a current path that includes one winding of the DC inductors and the one-way switch connected to this winding can be moved to, when the one-way switch is turned off, a current path that includes the winding of the coupled other DC inductor and the turned-on one-way switch connected to this winding. As described above, the DC inductors 17, 18, 27, 28, 37, and 38 are coupled so that current flowing through the one-way switch connected to one DC inductor moves to and continues to flow through the turned-on one-way switch connected to the other DC inductor when the one-way switch of the one DC inductor is turned off.

The first switching unit 10 is provided between the input terminal $T_R$ and the output terminals $T_U$, $T_V$, and $T_W$. The first switching unit 10 includes the two DC inductors 17 and 18 and a switch group 19 that consists of six one-way switches 11 to 16. The one-way switches 11 to 16 are respectively driven by switch driving signals S1R, S4R, S3R, S6R, S5R, and S2R. Moreover, the driving signals S1R, S4R, S3R, S6R, S5R, and S2R act as ON references by which the switching elements of the one-way switches 11 to 16 are turned on when the signals are High levels.

A current path from the input terminal $T_R$ to the output terminals $T_U$, $T_V$, and $T_W$ is formed by the DC inductor 17 and the three one-way switches 11, 13, and 15. On the other hand, a current path from the output terminals $T_U$, $T_V$, and $T_W$ to the input terminal $T_R$ is formed by the DC inductor 18 and the three one-way switches 12, 14, and 16.

The second switching unit 20 and the third switching unit 30 have the same configuration as that of the first switching unit 10 except that the connected input terminals are different. More specifically, the second switching unit 20 is provided between the input terminal $T_S$ and the output terminals $T_U$, $T_V$, and $T_W$ and includes the two DC inductors 27 and 28 and a switch group 29 that consists of six one-way switches 21 to 26. The one-way switches 21 to 26 are respectively driven by switch driving signals S1S, S4S, S3S, S6S, S5S, and S2S. Moreover, the driving signals S1S, S4S, S3S, S6S, S5S, and S2S act as ON references by which the switching elements of the one-way switches 21 to 26 are turned on when the signals are High levels.

A current path from the input terminal $T_S$ to the output terminals $T_U$, $T_V$, and $T_W$ is formed by the DC inductor 27 and the three one-way switches 21, 23, and 25. On the other hand, a current path from the output terminals $T_U$, $T_V$, and $T_W$ to the input terminal $T_S$ is formed by the DC inductor 28 and the three one-way switches 22, 24, and 26.

The third switching unit 30 is provided between the input terminal $T_T$ and the output terminals $T_U$, $T_V$, and $T_W$ and includes the two DC inductors 37 and 38 and a switch group 39 that consists of six one-way switches 31 to 36. The one-way switches 31 to 36 are respectively driven by switch driving signals S1T, S4T, S3T, S6T, S5T, and S2T. Moreover, the driving signals S1T, S4T, S3T, S6T, S5T, and S2T act as ON references by which the switching elements of the one-way switches 31 to 36 are turned on when the signals are High levels.

A current path from the input terminal $T_T$ to the output terminals $T_U$, $T_V$, and $T_W$ is formed by the DC inductor 37 and the three one-way switches 31, 33, and 35. On the other hand, a current path from the output terminals $T_U$, $T_V$, and $T_W$ to the input terminal $T_T$ is formed by the DC inductor 38 and the three one-way switches 32, 34, and 36.

As described above, the power conversion unit 2 includes the plurality of one-way switches 11 to 16, 21 to 26, and 31 to 36 between the respective input terminals and the output terminals, and are controlled by the switch driving signals S1R to S6R, S1S to S6S, and S1T to S6T. In this case, the one-way switches 11, 13, 15, 21, 23, 25, 31, 33, and 35 are examples of a first one-way switch, and the one-way switches 12, 14, 16, 22, 24, 26, 32, 34, and 36 examples of a second one-way switch.

Moreover, the power conversion unit 2 includes a snubber circuit 40, which has a function for suppressing a surge voltage, to protect the switching units 10, 20, and 30 from the surge voltage. The snubber circuit 40 will be later explained in detail.

The first filter unit 3 includes three capacitors 3a to 3c to function as an input-side filter. The one ends of the capacitors 3a to 3c are respectively connected to the input terminals $T_R$, $T_S$, and $T_T$, and the other ends are connected to one another.

The second filter unit 4 includes three capacitors 4a to 4c to function as an output-side filter. The one ends of the capacitors 4a to 4c are respectively connected to the output terminals $T_U$, $T_V$, and $T_W$, and the other ends are connected to one another.

The control unit 5 generates the switch driving signals S1R to S6R, S1S to S6S, and S1T to S6T described above, and outputs these signals to the power conversion unit 2. The power conversion unit 2 performs bidirectional power conversion between the input terminals $T_R$, $T_S$, and $T_T$ and the output terminals $T_U$, $T_V$, and $T_W$ on the basis of the switch driving signals S1R to S6R, S1S to S6S, and S1T to S6T from the control unit 5.

The control unit 5 generates the switch driving signals S1R to S6R, S1S to S6S, and S1T to S6T, which are pulse signals, in such a manner that currents always flow into one of the DC inductors 17, 27, and 37 and one of the DC inductors 18, 28, and 38.

As a result, the power conversion device 1 can pulse and control a direct current flowing inside and let it equal to that of the conventional current source power conversion device to perform an operation equal to that of the conventional current source power conversion device. Moreover, the power conversion device 1 can perform voltage step-up and step-down during power conversion without providing electric reactors and switches in the outside.

FIG. 2 is a diagram illustrating the configuration of a three-phase-input/three-phase-output current source inverter. The current source inverter generates a direct current idc from an alternating current by using a converter unit that performs AC-DC conversion, and then converts the direct current idc into an alternating current by using an inverter unit that performs DC-AC conversion.

As illustrated in FIG. 1, the power conversion unit 2 includes the plurality of one-way switches 11 to 16, 21 to 26, and 31 to 36 between the respective input terminals $T_R$, $T_S$, and $T_T$ and the output terminals $T_U$, $T_V$, and $T_W$. Herein, it can be regarded that the control of the power conversion unit 2 is divided into a control for the converter unit and a control for the inverter unit illustrated in FIG. 2.

The control unit 5 generates switch driving signals S1c to S6c for AC-DC conversion and switch driving signals S1i to S6i for DC-AC conversion. The switch driving signals S1c to S6c for AC-DC conversion are switch driving signals of the converter unit and the switch driving signals S1i to S6i for DC-AC conversion are switch driving signals of the inverter unit.

The control unit 5 synthesizes the switch driving signals S1c to S6c for AC-DC conversion and the switch driving signals S1i to S6i for DC-AC conversion to generate the switch driving signals S1R to S6R, S1S to S6S, and S1T to S6T that control the power conversion unit 2.

Hereinafter, the configuration of the control unit 5 will be specifically explained. FIG. 3 is a diagram illustrating a configuration example of the control unit 5. Herein, as an example, it is explained that AC power from the input terminals $T_R$, $T_S$, and $T_T$ is converted into AC power and is output to the output terminals $T_U$, $T_V$, and $T_W$. However, a reverse conversion to the above can be similarly controlled.

As illustrated in FIG. 3, the control unit 5 includes a current source inverter control circuit 51 and a driving signal distributor 55. The current source inverter control circuit 51 includes a current reference generator 52, a first pulse generator 53, and a second pulse generator 54.

The current reference generator 52 generates control signals (hereinafter, "converter control signals") for AC-DC conversion and outputs them to the first pulse generator 53. Moreover, the current reference generator 52 generates control signals (hereinafter, "inverter control signals") for DC-AC conversion and outputs them to the second pulse generator 54.

First, the inverter control signals will be explained. The current reference generator 52 generates, as the inverter control signals, current vectors $Ia_{out}$ and $Ib_{out}$, which constitute an output current reference vector, a current phase reference $\theta_{Iout}$, and a zero vector reference $Sz_{out}$, and outputs them to the second pulse generator 54.

Figure 4:
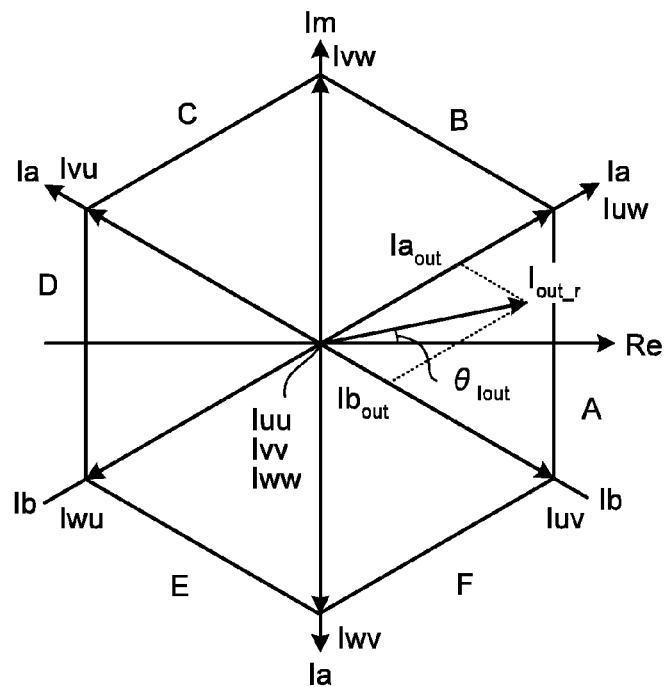
FIG. 4 is an output-side spatial vector diagram of the power conversion device according to the first embodiment.

The second pulse generator 54 generates and outputs the switch driving signals S1i to S6i according to nine current vectors Iuv, Iuw, Ivw, Ivu, Iwu, Iwv, Iuu, Ivv, and Iww illustrated in FIG. 4 on the basis of the inverter control signals.

Among the nine current vectors, the current vectors Iuv, Iuw, Ivw, Ivu, Iwu, and Iwv are current vectors (hereinafter, "effective vectors") that correspond to currents flowing between different output phases. For example, the effective vector Iuv is a current vector that corresponds to a current flowing between U and V phases. As illustrated in FIG. 4, an effective vector is classified into two kinds of an Ia vector and an Ib vector.

Among the nine current vectors, the current vectors Iuu, Ivv, and Iww are current vectors (hereinafter, "zero vectors") that correspond to the same output phase and that have the magnitude of zero. For example, the zero vector Iuu is a current vector that corresponds to a U phase and that has the magnitude of zero.

The second pulse generator 54 generates the switch driving signals S1i to S6i by using one zero vector and the two effective vectors $Ia_{out}$ and $Ib_{out}$ with non-zero magnitude that are adjacent to the current reference vector.

The output current reference vector is a vector that rotates in a vector space illustrated in FIG. 4 at an angular velocity that is determined with a current frequency in the output phase, when a current in the output phase is a sine wave, for example. Moreover, an inverter modulation factor $I_{out\_r}$ to be described below is the value of the output current reference vector when assuming that the value of an output current reference vector is "1" when the magnitude of the output current reference vector is equal to the radius of an inscribed circle of a hexagon illustrated in FIG. 4.

In the second pulse generator 54, the output time of a current vector used when generating the switch driving signals S1i to S6i is defined by the following Equations (1) to (3) from the inverter modulation factor $I_{out\_r}$ and the current phase reference $\theta_{Iout}$ that are determined from the magnitude and phase of the output current reference vector. Herein, the current phase reference $\theta_{Iout}$ is defined as an angle, which is formed by a real axis (the vector direction of a current flowing in the U phase) and the output current reference vector in the current vector space illustrated in FIG. 4, and has a value of 0 to $2\pi$ (radian).

"$\theta_0$" is an angle formed by the output current reference vector and an adjacent current vector Ia, and "Tsi" is a period of a PWM control. "$T_{ia}$" and "$T_{ib}$" are respectively output times of the effective vectors $Ia_{out}$ and $Ib_{out}$. "$Tz_{out}$" is an output time of a zero vector. Moreover, "$\theta_0$" has the following relationships with respect to $\theta_{Iout}$ in areas A to F illustrated in FIG. 4.

Area A (area where the imaginary axis (an Im axis obtained by advancing the real axis by 90 degrees in FIG. 4) component of the current vector is positive): $\theta_0 = \pi/6 - \theta_{Iout}$, Area A (area where the imaginary axis (the Im axis obtained by advancing the real axis by 90 degrees in FIG. 4) component of the current vector is negative): $\theta_0 = 13\pi/6 - \theta_{Iout}$, Area B: $\theta_0 = \theta_{Iout} - \pi/6$,
Area C: $\theta_0 = 5\pi/6 - \theta_{Iout}$,
Area D: $\theta_0 = \theta_{Iout} - 5\pi/6$,
Area E: $\theta_0 = 3\pi/2 - \theta_{Iout}$, and
Area F: $\theta_0 = \theta_{Iout} - 3\pi/2$.

$$T_{ia} = Tsi \cdot I_{out\_r} \cdot \sin(\pi/3 - \theta_0) \tag{1}$$

$$T_{ib} = Tsi \cdot I_{out\_r} \cdot \sin(\theta_0) \tag{2}$$

$$Tz_{out} = Tsi - T_{ia} - T_{ib} \tag{3}$$

FIG. 4 is an output-side spatial vector diagram of the power conversion device 1. For example, when the inverter modulation factor $I_{out\_r}$ and the current phase reference $\theta_{Iout}$ are in the state illustrated in FIG. 4, "$T_{ia}$" is the output time of the effective vector Iuw and "$T_{ib}$" is the output time of the effective vector Iuv. Moreover, "$Tz_{out}$" is the output time of one zero vector, which is designated by the zero vector reference $Sz_{out}$, among the zero vectors Iuu, Ivv, and Iww.

The second pulse generator 54 generates the switch driving signals S1i to S6i according to the output current reference vector by using pulse width modulation (PWM), for example, and outputs them to the driving signal distributor 55.

The first pulse generator 53 generates and outputs the switch driving signals S1c to S6c for AC-DC conversion on the basis of the converter control signals.

Herein, the converter control signals will be explained. The current reference generator 52 generates, as the converter control signals, current vectors $Ia_{in}$ and $Ib_{in}$ that constitute an input current reference vector, a current phase reference $\theta_{Iin}$, and a zero vector reference $Sz_{in}$, and outputs them to the first pulse generator 53.

The first pulse generator 53 generates and outputs the switch driving signals S1c to S6c according to nine current vectors Irt, Irs, Its, Itr, Isr, Ist, Irr, Iss, and Itt on the basis of the converter control signals.

Among the nine current vectors, the current vectors Irt, Irs, Its, Itr, Isr, and Ist are effective vectors that correspond to currents flowing between different input phases, and the current vectors Irr, Iss, and Itt are zero vectors that correspond to the same input phase. For example, the effective vector Irt is a current vector that corresponds to a current flowing between R and T phases, and the zero vector Irr is a current vector that corresponds to the R phase and that has the magnitude of zero. Moreover, as illustrated in FIG. 5, the effective vectors are classified into two kinds of $Ia_{in}$ and $Ib_{in}$ vectors.

The first pulse generator 53 generates the switch driving signals S1c to S6c by using one zero vector and the two effective vectors $Ia_{in}$ and $Ib_{in}$ with non-zero magnitude adjacent to the input current reference vector.

Figure 5:
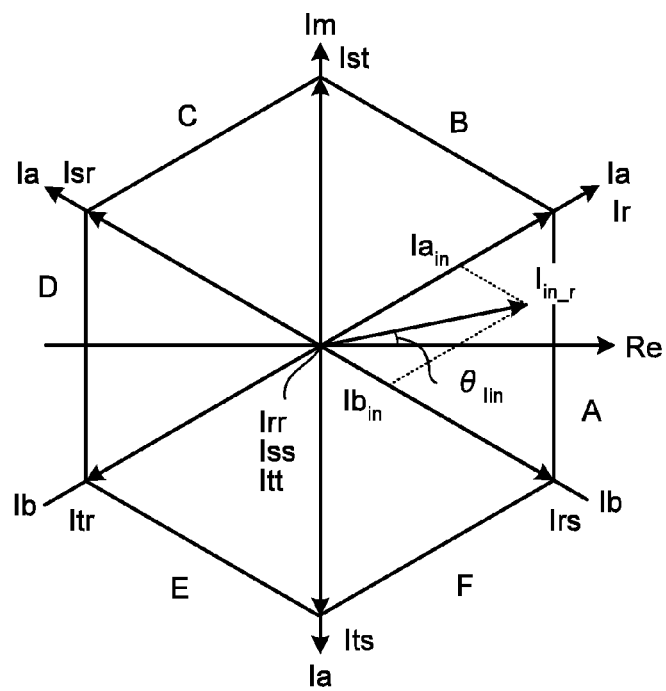
FIG. 5 is an input-side spatial vector diagram of the power conversion device according to the first embodiment.

The input current reference vector is a vector that rotates in a vector space illustrated in FIG. 5 at an angular velocity that is determined with a current frequency in the input phase, when a current in the input phase is a sine wave, for example. Moreover, a converter modulation factor $I_{in\_r}$ to be described below is the value of the input current reference vector when assuming that the value of an input current reference vector is "1" when the magnitude of the input current reference vector is equal to the radius of an inscribed circle of a hexagon illustrated in FIG. 5.

In the first pulse generator 53, the output time of a current vector used when generating the switch driving signals S1c to S6c is defined by the following Equations (4) to (6) from the converter modulation factor $I_{in\_r}$ and the current phase reference $\theta_{Iin}$ that are determined from the magnitude and phase of the input current reference vector. Herein, the current phase reference $\theta_{Iin}$ is defined as an angle, which is formed by a real axis (the vector direction of a current flowing in the R phase) and the input current reference vector in the current vector space illustrated in FIG. 5, and has a value of 0 to $2\pi$ (radian).

"$\theta_i$" is an angle formed by the input current reference vector and an adjacent current vector Ia, and "Tsc" is a control period. "$T_{ca}$" and "$T_{cb}$" are respectively output times of the effective vectors $Ia_{in}$ and $Ib_{in}$. "$Tz_{in}$" is an output time of a zero vector. Moreover, "$\theta_i$" has the following relationships with respect to $\theta_{Iin}$ in areas A to F illustrated in FIG. 5.

Area A (area where the imaginary axis (an Im axis obtained by advancing the real axis by 90 degrees in FIG. 5) component of the current vector is positive): $\theta_i = \pi/6 - \theta_{Iin}$, Area A (the imaginary axis (area where the Im axis obtained by advancing the real axis by 90 degrees in FIG. 5) component of the current vector is negative): $\theta_i = 13\pi/6 - \theta_{Iin}$, Area B: $\theta_i = \theta_{Iin} - \pi/6$,
Area C: $\theta_i = 5\pi/6 - \theta_{Iin}$,
Area D: $\theta_i = \theta_{Iin} - 5\pi/6$,
Area E: $\theta_i = 3\pi/2 - \theta_{Iin}$, and
Area F: $\theta_1 = \theta_{Iin} - 3\pi/2$.

$$T_{ca} = Tsc \cdot I_{in\_r} \cdot \sin(\pi/3 - \theta_i) \quad (4)$$

$$T_{cb} = Tsc \cdot I_{in\_r} \cdot \sin(\theta_i) \quad (5)$$

$$Tz_{in} = Tsc - T_{ca} - T_{cb} \quad (6)$$

FIG. 5 is an input-side spatial vector diagram of the power conversion device 1. For example, when the converter modulation factor $I_{in\_r}$ and the current phase reference $\theta_{Iin}$ are in the state illustrated in FIG. 5, "$I_{ca}$" is the output time of the effective vector Irt and "$T_{cb}$" is the output time of the effective vector Irs. Moreover, "$Tz_{in}$" is the output time of one zero vector, which is designated by the zero vector reference $Sz_{in}$, among the zero vectors Irr, Iss, and Itt.

The first pulse generator 53 generates the switch driving signals S1c to S6c according to the input current reference vector by using pulse width modulation, for example, and outputs them to the driving signal distributor 55.

The driving signal distributor 55 performs a logical product on the switch driving signals S1c to S6c for AC-DC conversion and the switch driving signals S1i to S6i for DC-AC conversion to generate the switch driving signals S1R to S6R, S1S to S6S, and S1T to S6T.

More specifically, the driving signal distributor 55 generates the switch driving signals S1R to S6R, S1S to S6S, and S1T to S6T by logical products indicated by Equation (7). The driving signal distributor 55 outputs the generated switch driving signals S1R to S6R, S1S to S6S, and S1T to S6T to the power conversion unit 2 to make the power conversion unit 2 execute power conversion.

$$S1R = S4c \cdot S1i \quad S3R = S4c \cdot S3i \quad S5R = S4c \cdot S5i$$

$$S4R = S1c \cdot S4i \quad S6R = S1c \cdot S6i \quad S2R = S1c \cdot S2i$$

$$S1S = S6c \cdot S1i \quad S3S = S6c \cdot S3i \quad S5S = S6c \cdot S5i$$

$$S4S = S3c \cdot S4i \quad S6S = S3c \cdot S6i \quad S2S = S3c \cdot S2i$$

$$S1T = S2c \cdot S1i \quad S3T = S2c \cdot S3i \quad S5T = S2c \cdot S5i$$

$$S4T = S5c \cdot S4i \quad S6T = S5c \cdot S6i \quad S2T = S5c \cdot S2i \quad (7)$$

As described above, the power conversion device 1 applies zero vectors and effective vectors to each of the inverter unit and the converter unit of FIG. 2 to perform the control of the power conversion unit 2. As a result, the power conversion device 1 can let currents determined by reference current vectors flow at an input side and an output side. At this time, a current with constant magnitude flows through one of the DC inductors 17, 27, and 37 from the input side to the output side. Moreover, a current with same constant magnitude flows through one of the DC inductors 18, 28, and 38 from the output side to the input side.

Furthermore, a pulse-shaped current corresponding to a half wave of an alternating current in the R phase, whose direction is directed into the power conversion device 1, flows in the DC inductor 17. A pulse-shaped current corresponding to a half wave of the alternating current in the R phase, whose direction is directed out of the power conversion device 1, flows in the DC inductor 18. Moreover, a pulse-shaped current corresponding to a half wave of an alternating current in the S phase, whose direction is directed into the power conversion device 1, flows in the DC inductor 27. A pulse-shaped current corresponding to a half wave of the alternating current in the S phase, whose direction is directed out of the power conversion device 1, flows in the DC inductor 28. Moreover, a pulse-shaped current corresponding to a half wave of an alternating current in the T phase, whose direction is directed into the power conversion device 1, flows in the DC inductor 37. A pulse-shaped current corresponding to a half wave of the alternating current in the T phase, whose direction is directed out of the power conversion device 1, flows in the DC inductor 38. These pulse-shaped currents are realized by making the constant-magnitude currents move and flow between the DC inductors in accordance with the action of the coupled DC inductors 17, 18, 27, 28, 37, and 38, in response to the on/off operation of the one-way switches 11-16, 21-26, and 31-36.

Next, the snubber circuit 40 will be explained. As described above, the power conversion device 1 includes the snubber circuit 40 that has a function for suppressing a surge voltage to protect the switching units 10, 20, and 30 from the surge voltage. Hereinafter, the snubber circuit 40 will be specifically explained.

As illustrated in FIG. 1, the snubber circuit 40 includes diodes 41 to 46 and a transient voltage suppressor (TVS) 47. The snubber circuit 40 is provided between the DC inductors 17, 18, 27, 28, 37, 38 and the switch groups 19, 29, 39.

One ends of the diodes 41 to 46 are connected to the DC inductors 17, 18, 27, 28, 37, and 38, and the other ends are connected to the transient voltage suppressor 47. More specifically, anodes of the diodes 41, 43, and 45 are respectively connected to the one ends of the DC inductors 17, 27, and 37, and cathodes of the diodes 42, 44, and 46 are respectively connected to the one ends of the DC inductors 18, 28, and 38. Moreover, cathodes of the diodes 41, 43, and 45 are connected to one end of the transient voltage suppressor 47, and anodes of the diodes 42, 44, and 46 are connected to the other end of the transient voltage suppressor 47.

The transient voltage suppressor 47 clamps a voltage between both ends to a predetermined value $V_{BR}$ when a surge voltage occurs. As a result, the maximum value of a voltage between the cathodes of the diodes 41, 43, 45 and the anodes of the diodes 42, 44, 46 is suppressed to the predetermined value $V_{BR}$.

Figure 6A:
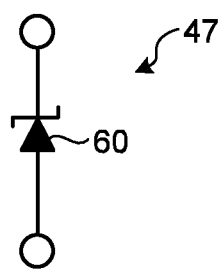
FIGS. 6A and 6B are diagrams illustrating an example of a transient voltage suppression circuit.
Figure 6B:
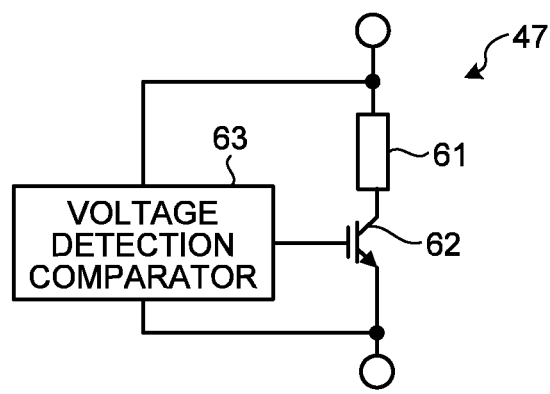

The transient voltage suppressor 47 is, for example, an avalanche diode 60 illustrated in FIG. 6A or a circuit illustrated in FIG. 6B. The circuit illustrated in FIG. 6B includes a resistor 61, a transistors 62, and a voltage detection comparator 63. The voltage detection comparator 63 makes the transistor 62 turn on to make the resistor 61 consume energy when a both-end voltage of the transient voltage suppressor 47 is not less than the predetermined value $V_{BR}$.

A degree of coupling between the DC inductors 17, 27, and 37 is smaller than 1. Therefore, when the current path including one of the DC inductors 17, 27, and 37 is switched from close to open and the current on the path is moved to a current path including the other DC inductor, a surge voltage occurs in the winding of the DC inductor on the opened current path. This is similar to the DC inductors 18, 28, and 38. The snubber circuit 40 suppresses the surge voltage to a value not more than a predetermined value $V_{CR}$ (=$V_{BR}$+Vf*2), which is a clamp voltage value, to protect the switching units 10, 20, and 30 from the surge voltage. "Vf" is the forward voltage drop of the diodes 41 to 46.

The predetermined value $V_{CR}$ is a value that is lower than the withstand voltage of the one-way switches that constitute the switching units 10, 20, and 30. As a result, it can be suppressed that a voltage larger than the predetermined value $V_{CR}$ is applied to the switching units 10, 20, and 30, and thus the protection of the switching units 10, 20, and 30 becomes possible.

It is preferable that the predetermined value $V_{CR}$ that is the clamp voltage value of the snubber circuit 40 is set to satisfy the following Equation (8) assuming that an input-phase rectified voltage value is $V_{INP}$ and an output-phase rectified voltage value is $V_{OUTP}$.

$$V_{CR} > \max(V_{OUTP}, V_{INP}) \quad (8)$$

The input-phase rectified voltage value $V_{INP}$ is the maximum value of an input phase to phase voltage (for example, instantaneous voltage between R and S phases). The output-phase rectified voltage value $V_{OUTP}$ is the maximum value of an output phase to phase voltage (for example, instantaneous voltage between U and V phases). Moreover, max($V_{OUTP}$, $V_{INP}$) is the larger value of $V_{OUTP}$ and $V_{INP}$.

Because the snubber circuit 40 with the predetermined value $V_{CR}$ larger than the input-phase rectified voltage value $V_{INP}$ does not operate at an input-phase voltage, it is possible to suppress power consumption when the power conversion unit 2 is in a waiting state.

Moreover, a surge voltage can be clamped at a voltage higher than an output-phase voltage by setting the predetermined value $V_{CR}$ to a value larger than the output-phase rectified voltage value $V_{OUTP}$. As a result, a power conversion operation of the power conversion unit 2 is not influenced by an action of the snubber circuit 40.

As described above, similarly to the three-phase-input/three-phase-output current source inverter illustrated in FIG. 2, the power conversion device 1 according to the first embodiment has characteristics that a power conversion direction is bidirectional (input phase-→output phase, output phase-→input phase) and step-up and step-down operations are possible.

As compared with the three-phase-input/three-phase-output current source inverter illustrated in FIG. 2, the power conversion device 1 according to the first embodiment has characteristics that the number of the one-way switches through which a current passes is decreased and thus a conduction loss can be reduced and an increase in a size of a device can be suppressed. Moreover, because step-up and step-down operations can be performed during power conversion without providing electric reactors and switches in the outside, the power conversion device 1 can suppress an increase in a size of a device as compared with the conventional matrix converter that has a step-up function.

Furthermore, because the power conversion device 1 according to the first embodiment includes the snubber circuit 40 that suppresses a surge voltage during a step-up operation to a value not more than a predetermined value, power consumption caused by a conduction loss can be suppressed and a protection for the switching units 10, 20, and 30 can be realized.

Second Embodiment

Next, a power conversion device according to the second embodiment will be explained. The power conversion device according to the second embodiment is different from the power conversion device 1 according to the first embodiment in that the configurations of both snubber circuits of the first and second embodiments are different. Hereinafter, components of the second embodiment that correspond to the components of the first embodiment have the same reference numbers, and explanations overlapping with the first embodiment are omitted.

Figure 7:
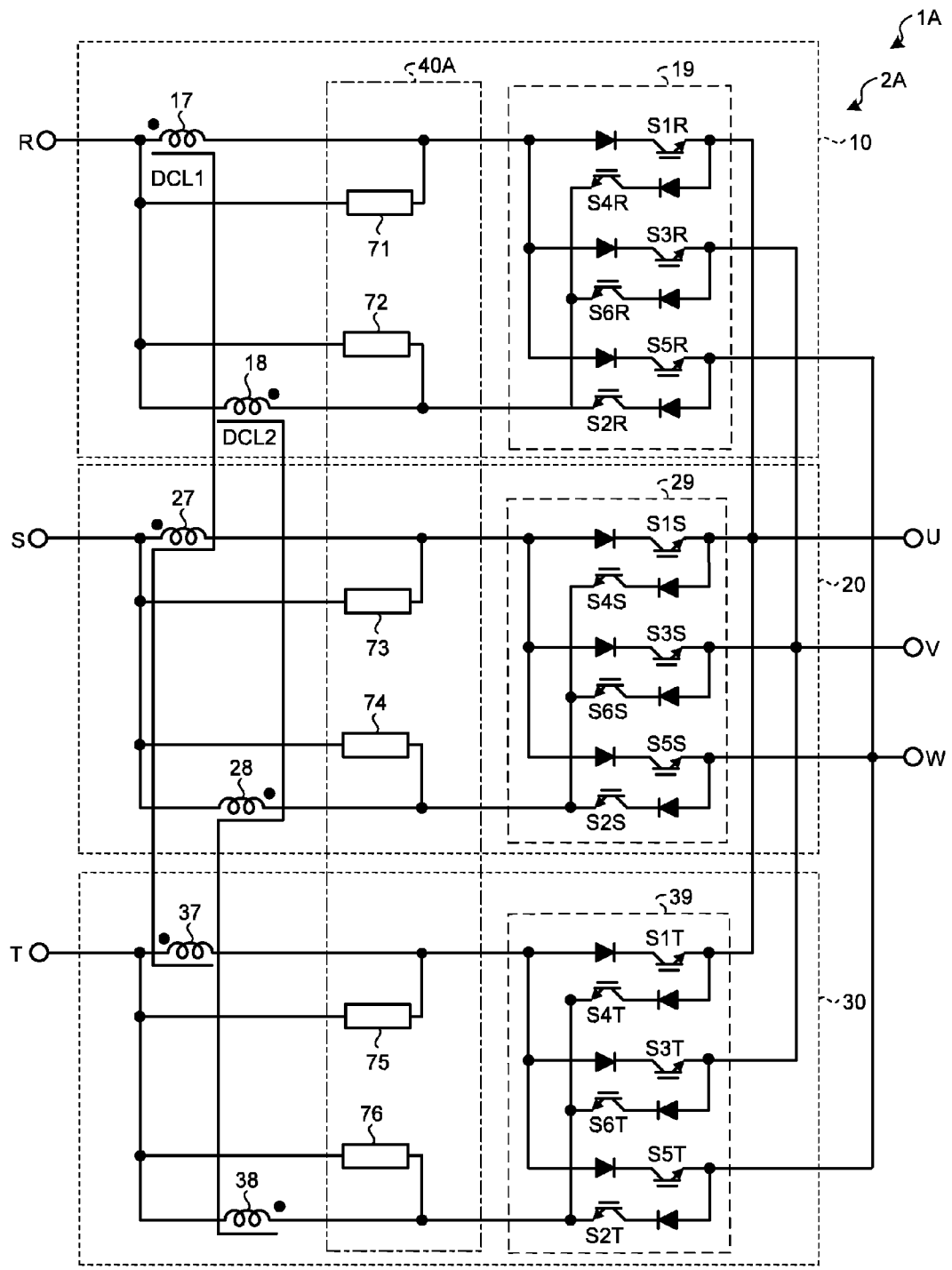
FIG. 7 is a diagram illustrating a configuration example of a power conversion unit of a power conversion device according to a second embodiment.

FIG. 7 is a diagram illustrating a configuration example of a power conversion unit 2A of a power conversion device 1A according to the second embodiment. As illustrated in FIG. 7, in the power conversion unit 2A of the power conversion device 1A according to the second embodiment, transient voltage suppressors 71 to 76 are respectively connected to the DC inductors 17, 18, 27, 28, 37, and 38 in parallel.

Figure 8:
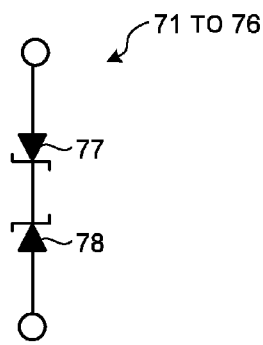
FIG. 8 is a diagram illustrating an example of a transient voltage suppression circuit.

The transient voltage suppressors 71 to 76 are circuits that bidirectionally clamp the maximum voltage between terminals of the corresponding DC inductors 17, 18, 27, 28, 37, and 38 so as to make it not more than a predetermined value $V_{CR}1$ (hereinafter, "clamp voltage $V_{CR}1$"). Each of the transient voltage suppressors 71 to 76 has a configuration that avalanche diodes 77 and 88 are serially connected in directions opposite to each other as illustrated in FIG. 8, for example. FIG. 8 is a diagram illustrating an example of the transient voltage suppressors 71 to 76.

It is preferable that the clamp voltage $V_{CR}1$ is a value lower than the withstand voltage of the one-way switches that constitute the switching units 10, 20, and 30 and is set to satisfy the following relational expression (9). That is to say, it is preferable that the clamp voltage $V_{CR}1$ is ½ of the predetermined value $V_{CR}$ described above. As a result, power consumption in a waiting state can be suppressed and a power conversion by the power conversion unit 2 is not influenced by an action of the transient voltage suppressors 71 to 76.

$$2V_{CR}1 > \max(V_{OUTP}, V_{INP}) \quad (9)$$

It should be noted that the configuration of each of the transient voltage suppressors 71 to 76 is not limited to the configuration illustrated in FIG. 8. That is to say, the transient voltage suppressors 71 to 76 may have any configuration that both-end voltages of the DC inductors 17, 18, 27, 28, 37, and 38 can be limited to the range of $\pm V_{CR}$.

For example, the transient voltage suppressors 71 to 76 can be configured by serially connecting circuits in FIG. 6B in directions opposite to each other and connecting a diode parallel with each circuit in an opposite direction. In this case, similarly to the clamp voltage $V_{CR}1$ described above, it is preferable that a clamp voltage $V_{CR}2$ of the circuit in FIG. 6B is ½ of the predetermined value $V_{CR}$.

As described above, the power conversion device 1A according to the second embodiment includes a snubber circuit 40A that suppresses a surge voltage to a value not more than a predetermined value. Similarly to the first embodiment, power consumption caused by a conduction loss can be suppressed and the switching units 10, 20, and 30 can be protected.

Moreover, because the snubber circuit 40A according to the second embodiment employs the six transient voltage suppressors 71 to 76 as compared with the snubber circuit 40 of the first embodiment that employs the one transient voltage suppressor 47, the snubber circuit 40A can distribute heat generating circuits.

Third Embodiment

Next, a power conversion device according to the third embodiment will be explained. The power conversion device according to the third embodiment is different from the power conversion device 1 according to the first embodiment in that a snubber circuit is further provided in a power conversion unit by the switch control of the power conversion unit. Hereinafter, components of the third embodiment that correspond to the components of the first embodiment have the same reference numbers, and explanations overlapping with the first embodiment are omitted.

Figure 9:
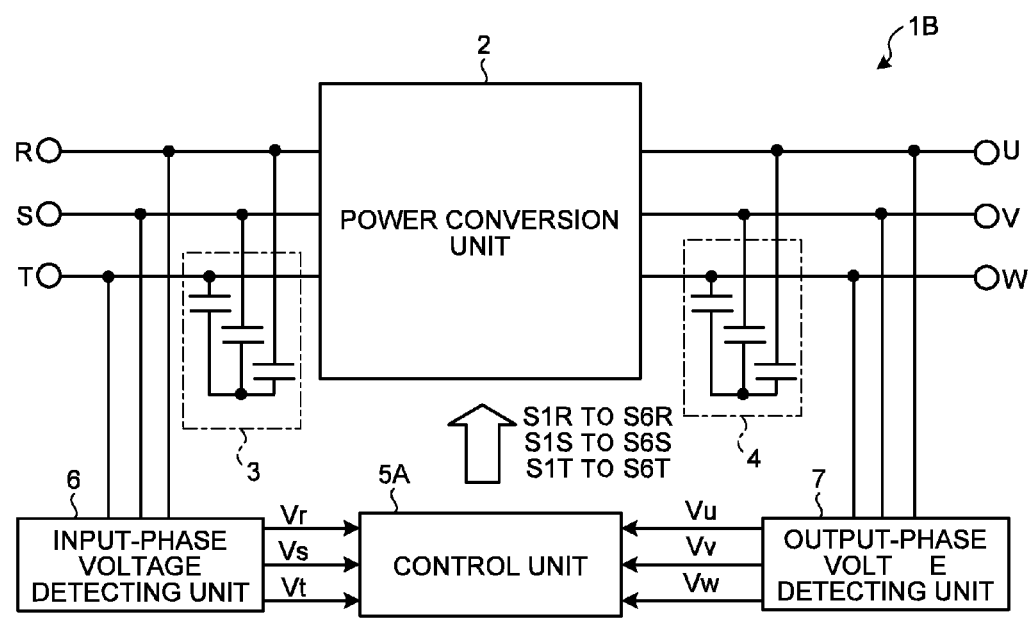
FIG. 9 is a diagram illustrating a configuration example of a power conversion device according to a third embodiment.

FIG. 9 is a diagram illustrating a configuration example of a power conversion device 1B according to the third embodiment. As illustrated in FIG. 9, the power conversion device 1B according to the third embodiment includes the power conversion unit 2, the first filter unit 3, the second filter unit 4, and a control unit 5A, and further includes an input-phase voltage detecting unit 6 and an output-phase voltage detecting unit 7.

The input-phase voltage detecting unit 6 detects instantaneous voltage values for R, S, and T input phases, and outputs to the control unit 5A an R-phase voltage value Vr, an S-phase voltage value Vs, and a T-phase voltage value Vt (hereinafter, "input voltage values Vr, Vs, and Vt"), which are the detection results.

The output-phase voltage detecting unit 7 detects instantaneous voltage values for U, V, and W output phases, and outputs to the control unit 5A a U-phase voltage value Vu, a V-phase voltage value Vv, and a W-phase voltage value Vw (hereinafter, "output voltage values Vu, Vv, and Vw"), which are the detection results.

The control unit 5A controls the switching units 10, 20, and 30 of the power conversion unit 2. For example, the control unit 5A steps up and down a three-phase input voltage of R, S, and T phases and generates a three-phase output voltage of U, V, and W phases.

Furthermore, when generating a three-phase output voltage, the control unit 5A selects a one-way switch on the basis of the input voltage values Vr, Vs, Vt and the output voltage values Vu, Vv, Vw, turns on the selected one-way switch, and increases the number of the turned-on one-way switches to form a snubber circuit to be described below.

More specifically, while the maximum voltage of an output phase is higher than the maximum voltage of an input phase (hereinafter, "first term"), the control unit 5A turns on one-way switches through which currents flow from the input phases to the maximum-voltage output phase. Herein, "the maximum voltage of an output phase" is a voltage of an output phase with the highest voltage among three output phases of U, V, and W phases and "the maximum voltage of an input phase" is a voltage of an input phase with the highest voltage among three input phases of R, S, and T phases.

Figure 10:
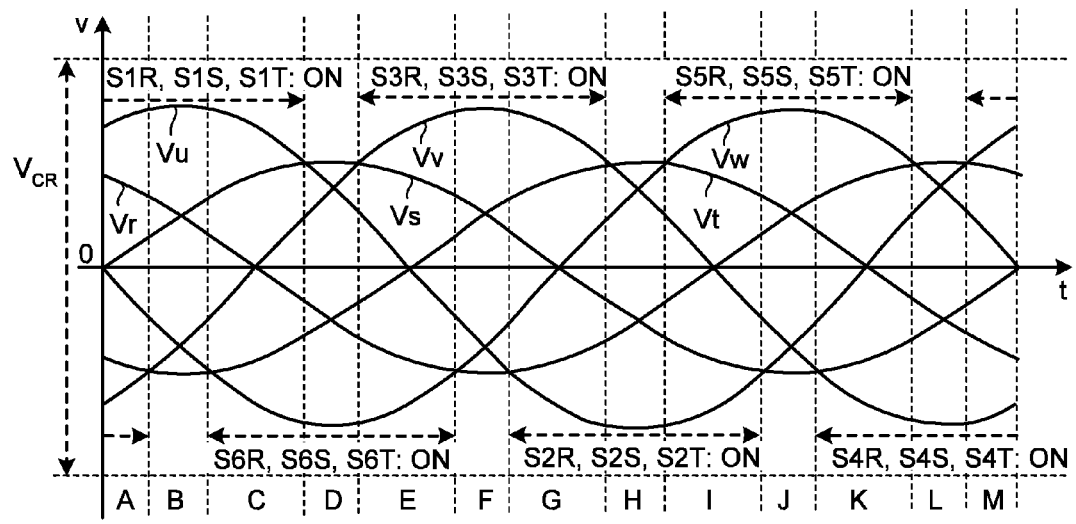
FIGS. 10 and 11 are diagrams illustrating a switch control example of the power conversion device according to the third embodiment.

FIG. 10 is a diagram illustrating a switch control example of the power conversion device 1B. A relationship of the input voltage values Vr, Vs, Vt, the output voltage values Vu, Vv, Vw, and the controlled one-way switches is illustrated in FIG. 10. In sections A to C, and M illustrated in FIG. 10, a maximum-voltage output phase is the U phase. Therefore, in the sections A to C, and M, the control unit 5A sets the switch driving signals S1R, S1S, S1T to a High level and turns on the one-way switches 11, 21, 31 through which currents flow from the R, S, and T input phases to the U phase.

Similarly, because a maximum-voltage output phase is the V phase in sections E to G illustrated in FIG. 10, the control unit 5A sets the switch driving signals S3R, S3S, S3T to a High level and turns on the one-way switches 13, 23, 33 through which currents flow from the input phases to the V phase. Moreover, because a maximum-voltage output phase is the W phase in sections I to K illustrated in FIG. 10, the control unit 5A sets the switch driving signals S5R, S5S, S5T to a High level and turns on the one-way switches 15, 25, 35 through which currents flow from the input phases to the W phase.

Furthermore, while the minimum voltage of an output phase is lower than the minimum voltage of an input phase (hereinafter, "second term"), the control unit 5A turns on one-way switches through which currents flow from a minimum-voltage output phase to the input phases. Herein, "the minimum voltage of an output phase" is a voltage of an output phase with the lowest voltage among three output phases of U, V, and W phases and "the minimum voltage of an input phase" is a voltage of an input phase with the lowest voltage among three input phases of R, S, and T phases.

For example, in sections C to E illustrated in FIG. 10, a minimum-voltage output phase is the W phase. Therefore, in the sections C to E, the control unit 5A sets the switch driving signals S6R, S6S, S6T to a High level and turns on the one-way switches 16, 26, 36 through which currents flow from the W phase to the input phases.

Similarly, because a minimum-voltage output phase is the U phase in sections G to I illustrated in FIG. 10, the control unit 5A sets the switch driving signals S2R, S2S, S2T to a High level and turns on the one-way switches 12, 22, 32 through which currents flow from the U phase to the input phases. Moreover, because a minimum-voltage output phase is the V phase in sections K to M, and A illustrated in FIG. 10, the control unit 5A sets the switch driving signals S4R, S4S, S4T to a High level and turns on the one-way switches 14, 24, 34 through which currents flow from the V phase to the input phases.

Figure 11:
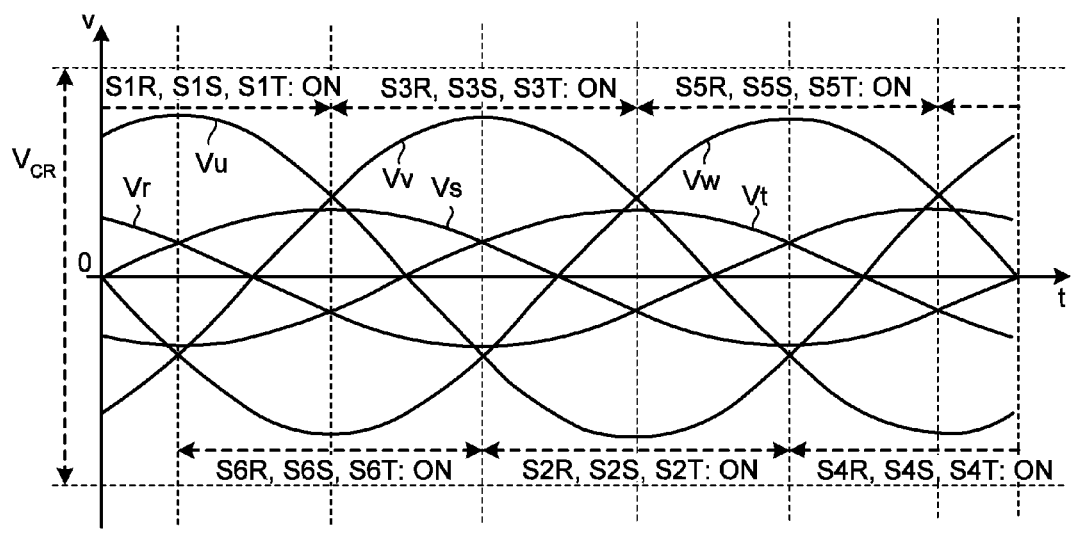

In FIG. 10, it has been illustrated that the first term, when the maximum voltage of an output phase is higher than the maximum voltage of an input phase, and the second term, when the minimum voltage of an output phase is lower than the minimum voltage of an input phase, are a part of a term when one output-phase voltage is the maximum among output-phase voltages and a part of a term when one output-phase voltage is the minimum among the output-phase voltages. On the other hand, as illustrated in FIG. 11, even if the first and second terms are the entire terms, they are similarly controlled by the control unit 5A. FIG. 11 is a diagram illustrating a switch control example of the power conversion device 1B. FIG. 11 is different from FIG. 10 from the viewpoint of a relationship between an input-phase voltage and an output-phase voltage. The maximum value of the input-phase voltage is smaller than $\sqrt{3}/2$ of the maximum value of the output-phase voltage.

As described above, because the one-way switches are controlled to be turned on in the first and second terms, a snubber circuit can be formed by the switching units 10, 20, and 30 of the power conversion unit 2 in the overlapping term of the first and second terms.

For example, in the section C illustrated in FIG. 10, the one-way switches 11, 21, and 31 are turned on and the one-way switches 16, 26, and 36 are turned on, as described above. The switching elements of the turned-on one-way switches perform operations equivalent to those of diodes.

Figure 12:
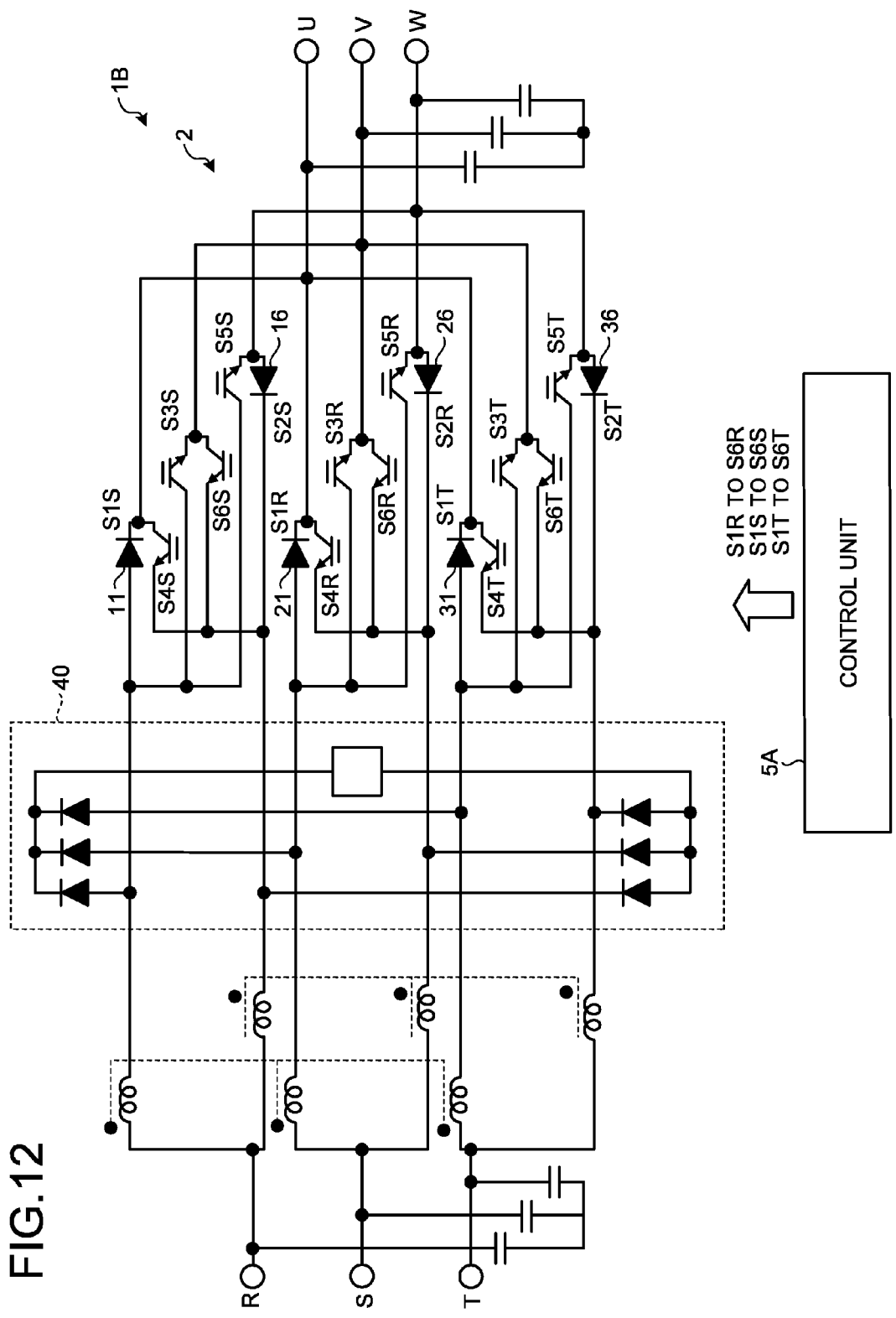
FIG. 12 is an explanation diagram of a configuration example of a circuit formed in the power conversion device according to the third embodiment.

FIG. 12 is an explanation diagram of a configuration example of a circuit formed in the power conversion device 1B. As described above, in the section C illustrated in FIG. 10, the turned-on one-way switches 11, 21, 31, 16, 26, and 36 can be replaced by diodes. Therefore, the circuit in FIG. 1 can be considered as the circuit in FIG. 12. An example in which a reverse blocking IGBT is employed in the one-way switches 11-16, 21-26, and 31-36 is illustrated in FIG. 12.

Figure 13:
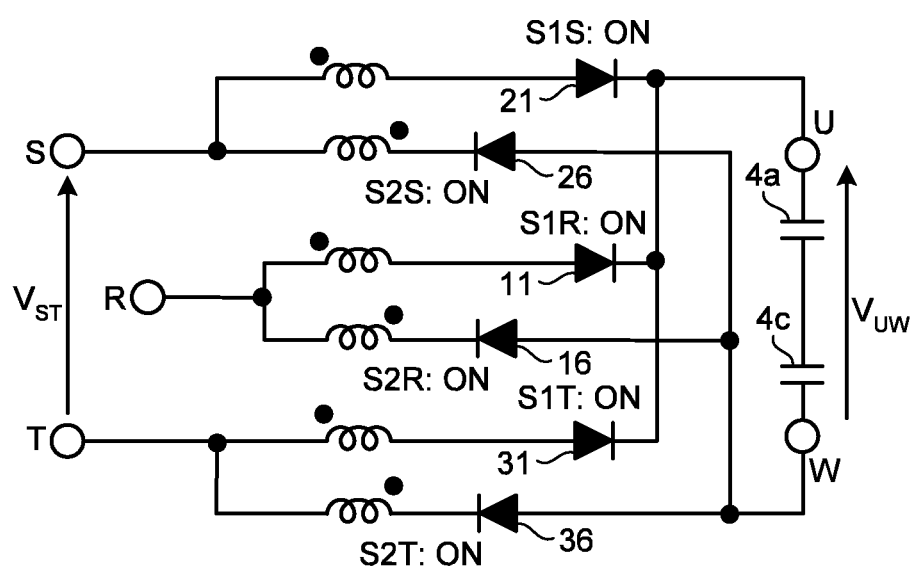
FIG. 13 is an explanation diagram of a configuration example of a snubber circuit formed in the power conversion device according to the third embodiment.

In the circuit illustrated in FIG. 12, a snubber circuit illustrated in FIG. 13 is formed by the turned-on one-way switches 11, 21, 31, 16, 26, and 36. FIG. 13 is an explanation diagram of a configuration example of a snubber circuit formed in the power conversion device 1B.

The snubber circuit illustrated in FIG. 13 is constituted by output side capacitors C4a, C4c and the turned-on one-way switches 11, 21, 31, 16, 26, 36. The DC inductors 17, 18, 27, 28, 37, and 38 are connected to the output side capacitors C4a and C4c via the turned-on one-way switches 11, 21, 31, 16, 26, and 36 that are equivalent to diodes. When the relationship of $V_{CR} > V_{OUTP} > V_{INP}$ is realized, remaining energy of the DC inductors 17, 18, 27, 28, 37, and 38 is discharged to the output side capacitors C4a and C4c.

As a result, the remaining energy of the DC inductors 17, 18, 27, 28, 37, and 38 is supplied to a load and consumption in the transient voltage suppressor 47 is suppressed. Therefore, power conversion efficiency can be improved as compared with the case when the switch control described above is not performed.

As described above, because the snubber circuit 40 in FIG. 1 and the snubber circuit in FIG. 13 are arranged in parallel in the section C illustrated in FIG. 10, a part of surge power is discharged to the output side and thus power conversion efficiency is improved. Moreover, the snubber circuit is similarly formed in other overlapping terms of the first and second terms.

When the relationship of $V_{CR} > V_{OUTP} > V_{INP}$ is realized in the sections B, D, F, H, J, and L illustrated in FIG. 10, the control unit 5A can continue to turn on the one-way switches that constitute the snubber circuit described above. Therefore, in this case, because the snubber circuit is formed over all periods of the input or output voltage, power conversion efficiency can be improved.

In the above examples, it has been explained that the input voltage values Vr, Vs, Vt detected by the input-phase voltage detecting unit 6 are used. When an input-phase voltage reference is generated, the minimum voltage and the maximum voltage of the input phase may be determined by using the input-phase voltage reference. Similarly, it has been explained that the output voltage values Vu, Vv, Vw detected by the output-phase voltage detecting unit 7 are used. When an output-phase voltage reference is generated, the minimum voltage and the maximum voltage of the output phase may be determined by using the output-phase voltage reference. In this case, the input-phase voltage detecting unit 6 or the output-phase voltage detecting unit 7 can be removed.

In the example illustrated in FIG. 10, it has been explained that the first and second terms start and end on the instance when the instantaneous voltages of the output phase and the input phase are equal to each other. However, the setting method of the first and second terms is not limited to this. For example, a term, when the maximum voltage of an output phase is not lower than the voltage which is formed by adding a predetermined value to the maximum voltage of an input phase, may be set as the first term, and a term, when the minimum voltage of the output phase is not higher than the voltage which is formed by adding a predetermined value to the minimum voltage of the input phase, may be set as the second term. In this case, the prevention of a short circuit caused by a voltage detection error can be achieved and the absorbing speed of remaining energy can be increased.

In the third embodiment, it has been explained that the switch control described above is performed on the power conversion device 1 according to the first embodiment. The similar switch control may be performed on the power conversion device 1A according to the second embodiment.

In the first to third embodiments, it has been explained that the two inductor elements DCL1 and DCL2 are provided. However, the present invention is not limited to these embodiments. For example, the number of inductor elements may be one. In this case, it is only necessary that one of the inductor elements DCL1 and DCL2 is provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power conversion device comprising:
   a plurality of switch groups that are respectively provided for input phases and each of which includes a plurality of one-way switches that connects the corresponding input phase and output phases;
   a plurality of inductors that are respectively connected between the input phases and the switch groups and are coupled to one another so that current flowing through the one-way switch of one switch group moves to and continues to flow through the turned-on one-way switch of the other switch group when the one-way switch of the one switch group is turned off;
   a snubber circuit that clamps a voltage based on a maximum voltage occurring on the plurality of inductors to a predetermined value; and a control unit that controls the plurality of one-way switches.

2. The power conversion device according to claim 1, wherein
the snubber circuit includes:
a plurality of diodes of which one ends are respectively connected to the inductors; and
a transient voltage suppressor that is connected to other ends of the diodes and clamps a maximum voltage between the other ends of the diodes to a predetermined value.

3. The power conversion device according to claim 2, wherein
the plurality of one-way switches that connect the input phase and the output phases include: first one-way switches through which currents flow from the input phase to the output phases; and second one-way switches through which currents flow from the output phases to the input phase,
the power conversion device includes, as the plurality of inductors, first inductors are provided between the input phases and the first one-way switches and/or second inductors are provided between the input phases and the second one-way switches, and
the first inductors are magnetically coupled to one another in a same coupling direction and the second inductors are magnetically coupled to one another in the same coupling direction.

4. The power conversion device according to claim 3, wherein the control unit: turns on, in a term in which a phase voltage of the output phase that outputs a maximum voltage among the output phases is higher than a phase voltage of the input phase into which the maximum voltage is input among the input phases, the first one-way switches that connect the maximum-voltage output phase to the input phases; and turns on, in a term in which a phase voltage of the output phase that outputs a minimum voltage among the output phases is lower than a phase voltage of the input phase into which the minimum voltage is input among the input phases, the second one-way switches that connect the minimum-voltage output phase to the input phases.

5. The power conversion device according to claim 3, wherein the control unit: turns on, in a term in which a phase voltage of the output phase that outputs a maximum voltage among the output phases is higher than a voltage formed by adding a predetermined value to a phase voltage of the input phase into which the maximum voltage is input among the input phases, the first one-way switches that connect the maximum-voltage output phase to the input phases; and turns on, in a term in which a phase voltage of the output phase that outputs a minimum voltage among the output phases is lower than a voltage formed by adding a predetermined value to a phase voltage of the input phase into which the minimum voltage is input among the input phases, the second one-way switches that connect the minimum-voltage output phase to the input phases.

6. The power conversion device according to claim 3, wherein the control unit turns on: when a maximum voltage among output line-to-line voltages is higher than a maximum voltage among input line-to-line voltages, among the two output phases that output the maximum voltage among the output line-to-line voltages, the first one-way switches that connect the output phase whose phase voltage is positive to the input phases; and turns on the second one-way switches that connect the output phase whose phase voltage is negative to the input phases.

7. The power conversion device according to claim 1, wherein the snubber circuit comprises, for each of the inductors, transient voltage suppressors that clamp a maximum voltage between terminals of the inductor to a predetermined value.

8. The power conversion device according to claim 7, wherein
the plurality of one-way switches that connect the input phase and the output phases include: first one-way switches through which currents flow from the input phase to the output phases; and second one-way switches through which currents flow from the output phases to the input phase,
the power conversion device includes, as the plurality of inductors, first inductors are provided between the input phases and the first one-way switches and/or second inductors are provided between the input phases and the second one-way switches, and
the first inductors are magnetically coupled to one another in a same coupling direction and the second inductors are magnetically coupled to one another in the same coupling direction.

9. The power conversion device according to claim 8, wherein the control unit: turns on, in a term in which a phase voltage of the output phase that outputs a maximum voltage among the output phases is higher than a phase voltage of the input phase into which the maximum voltage is input among the input phases, the first one-way switches that connect the maximum-voltage output phase to the input phases; and turns on, in a term in which a phase voltage of the output phase that outputs a minimum voltage among the output phases is lower than a phase voltage of the input phase into which the minimum voltage is input among the input phases, the second one-way switches that connect the minimum-voltage output phase to the input phases.

10. The power conversion device according to claim 8, wherein the control unit: turns on, in a term in which a phase voltage of the output phase that outputs a maximum voltage among the output phases is higher than a voltage formed by adding a predetermined value to a phase voltage of the input phase into which the maximum voltage is input among the input phases, the first one-way switches that connect the maximum-voltage output phase to the input phases; and turns on, in a term in which a phase voltage of the output phase that outputs a minimum voltage among the output phases is lower than a voltage formed by adding a predetermined value to a phase voltage of the input phase into which the minimum voltage is input among the input phases, the second one-way switches that connect the minimum-voltage output phase to the input phases.

11. The power conversion device according to claim 8, wherein the control unit turns on: when a maximum voltage among output line-to-line voltages is higher than a maximum voltage among input line-to-line voltages, among the two output phases that output the maximum voltage among the output line-to-line voltages, the first one-way switches that connect the output phase whose phase voltage is positive to the input phases; and turns on the second one-way switches that connect the output phase whose phase voltage is negative to the input phases.

12. The power conversion device according to claim 1, wherein
the plurality of one-way switches that connect the input phase and the output phases include: first one-way switches through which currents flow from the input phase to the output phases; and second one-way switches through which currents flow from the output phases to the input phase, the power conversion device includes, as the plurality of inductors, first inductors are provided between the input phases and the first one-way switches and/or second inductors are provided between the input phases and the second one-way switches, and the first inductors are magnetically coupled to one another in a same coupling direction and the second inductors are magnetically coupled to one another in the same coupling direction.

13. The power conversion device according to claim 12, wherein the control unit: turns on, in a term in which a phase voltage of the output phase that outputs a maximum voltage among the output phases is higher than a phase voltage of the input phase into which the maximum voltage is input among the input phases, the first one-way switches that connect the maximum-voltage output phase to the input phases; and turns on, in a term in which a phase voltage of the output phase that outputs a minimum voltage among the output phases is lower than a phase voltage of the input phase into which the minimum voltage is input among the input phases, the second one-way switches that connect the minimum-voltage output phase to the input phases.

14. The power conversion device according to claim 12, wherein the control unit: turns on, in a term in which a phase voltage of the output phase that outputs a maximum voltage among the output phases is higher than a voltage formed by adding a predetermined value to a phase voltage of the input phase into which the maximum voltage is input among the input phases, the first one-way switches that connect the maximum-voltage output phase to the input phases; and turns on, in a term in which a phase voltage of the output phase that outputs a minimum voltage among the output phases is lower than a voltage formed by adding a predetermined value to a phase voltage of the input phase into which the minimum voltage is input among the input phases, the second one-way switches that connect the minimum-voltage output phase to the input phases.

15. The power conversion device according to claim 12, wherein the control unit turns on: when a maximum voltage among output line-to-line voltages is higher than a maximum voltage among input line-to-line voltages, among the two output phases that output the maximum voltage among the output line-to-line voltages, the first one-way switches that connect the output phase whose phase voltage is positive to the input phases; and turns on the second one-way switches that connect the output phase whose phase voltage is negative to the input phases.

16. The power conversion device according to claim 1, wherein bidirectional power conversion is performed between the input phases and the output phases by controlling the plurality of one-way switches.

17. A power conversion device comprising:
a plurality of switch groups that are respectively provided for input phases and each of which includes a plurality of one-way switches that connects the corresponding input phase and output phases;
a plurality of inductors that are respectively connected between the input phases and the switch groups and are coupled to one another so that current flowing through the one-way switch of one switch group moves to and continues to flow through the turned-on one-way switch of the other switch group when the one-way switch of the one switch group is turned off;
a clamping means that clamps a voltage based on a maximum voltage occurring on the plurality of inductors to a predetermined value; and
a control means that controls the plurality of one-way switches.

* * * * *